United States Patent [19]

Bottaro et al.

[11] Patent Number: 5,254,324
[45] Date of Patent: Oct. 19, 1993

[54] DINITRAMIDE SALTS AND METHOD OF MAKING SAME

[75] Inventors: Jeffrey C. Bottaro, Mountain View; Robert J. Schmitt, Redwood City; Paul E. Penwell, Menlo Park; David S. Ross, Palo Alto, all of Calif.

[73] Assignee: SRI International, Menlo Park, Calif.

[21] Appl. No.: 540,020

[22] Filed: Jun. 18, 1990

[51] Int. Cl.$^5$ ............................................. C01F 17/00
[52] U.S. Cl. .................................. 423/263; 423/385; 423/249; 149/45; 564/107; 564/109
[58] Field of Search .............. 423/263, 385, 249, 250, 423/252, 253, 251, 387; 149/45; 564/107, 109

[56] References Cited

U.S. PATENT DOCUMENTS 3,428,667  2/1969  Hamel et al. ........................ 564/107
4,878,968 11/1989  Willer et al. ........................ 149/45

FOREIGN PATENT DOCUMENTS 44-7687  4/1969  Japan ..................................... 564/109

OTHER PUBLICATIONS

Leroy, George, et al., "A Theoretical Investigation of the Structure and Reactivity of Nitrogen-Centred Radicals", *Journal of Molecular Structure (Theochem)*, 153 (1987), pp. 249 and Table 6.

"Third Quarterly Report: Basic Research in Solid Oxygen Oxidizers (u)", Report 0754-81Q-3, Dec., 1963, pp. 6-7.

*Primary Examiner*—Wayne Langel
*Assistant Examiner*—Stuart L. Hendrickson
*Attorney, Agent, or Firm*—John P. Taylor

[57] ABSTRACT

A N,N-dinitramide salt is disclosed having the formula $MN(NO_2)_2$ where M is a cation selected from the class consisting of a metal ion and a nitrogen-containing ion. The dinitramide salt exhibits high temperature stability, high energy density, and an absence of smoke generating halogens, rendering it useful as an oxidizer in rocket fuels. The dinitramide salts are meltable and pumpable oxidizers which may be used in start-stop rocket engines instead of other less stable oxidizers.

21 Claims, 1 Drawing Sheet

FORMING A DINITRAMINE HAVING
THE FORMULA $RN(NO_2)_2$ BY REACTING
AN ALIPHATIC ISOCYANATE HAVING A
FORMULA R-C=N=O WITH STOICHIOMETRIC
QUANTITIES OF NITRONIUM
TETRAFLUOROBORATE AND
NITRIC ACID IN ACETONITRILE

REACTING EITHER A DINITRAMINE HAVING
THE FORMULA $RN(NO_2)_2$ OR AN ACID
HAVING THE FORMULA $HN(NO_2)_2$ WITH
AMMONIA, HYDRAZINE, OR A SALT HAVING
THE FORMULA MX TO FORM A
DINITRAMIDE SALT HAVING THE
FORMULA $M^{+r}[N(NO_2)_2^-]_r$ WHERE M IS A
METAL CATION OR A NITROGEN-CONTAINING
CATION, r IS THE CATIONIC CHARGE OF
OF M, AND X IS A FLUORIDE,
CHLORIDE, HYDROXYL, CARBONATE,
ALKOXIDE, OR CARBOXYL ANION

DINITRAMIDE SALTS AND METHOD OF MAKING SAME

GOVERNMENT RIGHTS

This invention was made under government contracts N00014-86-C-0699 and N00014-88-C-0537 of the Office of Naval Research; and the government of the United States, therefore, has rights in this invention.

BACKGROUND OF THE INVENTION

1. Field of the Invention

This invention relates to dinitramide salts and a method of making same from alkyl-N,N-dinitramines.

2. Description of the Related Art

Solid oxidizers, such as ammonium perchlorate or potassium perchlorate, have been used in the past in rocket propellant formulation because of their greater stability than liquid oxidizers. However, the presence of a halogen in the solid oxidant produces a smoke trail which is observable on radar and sometimes visually as well. Also, chlorine poses a serious atmospheric environmental hazard of ozone depletion.

Because of such shortcomings in the use of perchlorate solid fuel oxidizers, other materials, including nitrate ($NO_3$) compounds, have been investigated in the search for oxidizers which would provide the desired energy density and stability, without the drawbacks of the perchlorate oxidants.

Hamel et al. U.S Pat. No. 3,428,667 describes the reaction of an ionic nitronium salt with a primary organic nitramine to form N,N-dinitramines having the general formula $R-N((NO_2)_2)_a$ where n is 1-2 and R is a monovalent or divalent organic radical. These compounds are said to be highly energetic and useful as ingredients in propellant, explosive, and pyrotechnic compositions.

Willer et al. U.S. Pat. No. 4,878,968 describes the formation of gun and rocket propellants which include substituted cubanes such as cubane-1,4-bis(ammonium nitrate), or 1,4-bis(ammonium)pentacyclo[4.2.0.0$^{2.5}$.0$^{3.8}$.0$^{4.7}$]octane dinitrate; and cubane ammonium nitrate, or pentacyclo-[4.2.0.0$^{2.5}$.0$^{3.8}$0$^{4\,7}$]-octylammonium nitrate.

Leroy et al., in "A Theoretical Investigation of the Structure and Reactivity of Nitrogen-Centered Radicals", published in the Journal of Molecular Structure (Theochem), 153 (1987) on pages 249-267, by Elsevier Science Publishers B.V. Amsterdam, The Netherlands, discusses the structure, stability, and reactivity of nitrogen-centered radicals. Listed in Table 6 are various reactions of N-centered radicals, including reactions of $N(NO_2)_2$ with $NH_2$ to form $2NHNO_2$, and with $CH_3NHNO_2$ to form $CH_3NNO_2$ and $NH(NO_2)$.

In the Third Quarterly Report on Basic Research in Solid Oxygen Oxidizers of Government Contract AF 04(611)-8549 dated December 1963, on pages 6 and 7, the reaction of nitronium tetrafluoroborate with the dianion of methylenedinitramine to form an intermediate anion is hypothesized and it is speculated that the intermediate anion may either react with a second equivalent of nitronium tetrafluoroborate to form N,N,N',N'-tetranitromethylenediamine or undergo fragmentation to form an anion which has the formula $N(NO_2)_2$.

It would, however, be desirable to provide a stable solid ionic nitro compound useful as a rocket propellant fuel which would have the clear advantage over perchlorates of being free of chlorine, but would be as stable as presently used perchlorate compounds and be much more stable and cheaper than prior art dinitramine compounds.

SUMMARY OF THE INVENTION

It is, therefore an object of this invention to provide novel N,N-dinitramide salts having the formula $M^{30}$ $_r[N(NO_2)_2^{31}]_r$, where M is selected from the class consisting of a metal cation and a nitrogen-containing cation and where r is the cationic charge of M.

It is another object of this invention to provide novel N,N-dinitramide salts having the formula $M^+{}_r[N(NO_2)_2^{31}]_r$, where $M^+$ is selected from the class consisting of a metal cation and a nitrogen-containing cation having from 1 to 8 nitrogen atoms and where r is the cationic charge of M.

It is yet another object of this invention to provide novel N,N-dinitramide salts having the formula $M^{30}$ $_r[N(NO_2)_2^{31}]_r$, where $M^+$ is a metal ion, the salt of which is capable of reacting with a nitrogen-containing compound to form the N,N-dinitramide salt and where r is the cationic charge of M.

It is still another object of this invention to provide novel N,N-dinitramide salts having the formula where $M^{30\ 31}\ N(NO_2)_2$, where $M^{30}$ is a 1-8 nitrogen-containing ion.

It is a further object of this invention to provide novel N,N-dinitramide salts having the formula $M^{30\ 31}$ $N(NO_2)_2$, where $M^{30}$ is a 1-8 nitrogen-containing ion having the formula $(R_kH_mN_a)^{30\,z}$, wherein n=1 to 8, z =1 to n, k=0 to n+2+z, m=n+2+z−k, and each R is the same or different 1-6 carbon alkyl.

It is still a further object of this invention to provide novel N,N-dinitramide salts having the formula $M^{30}$ $-N(NO_2)_2$, where M is selected from the class consisting of a nitrogen-containing cation having from 1 to 2 nitrogen atoms, such as a substituted ammonium ion, an ammonium ion, a substituted hydrazinium ion, and a hydrazinium ion.

It is yet a further object of this invention to provide a method of making N,N-dinitramide salts having the formula $M^{30}$ $_r[N(NO_2)_2^-]_r$, where $M^{30}$ is selected from the class consisting of a metal cation and a nitrogen-containing cation such as a substituted ammonium ion and where r is the cationic charge of M, an ammonium ion, a substituted hydrazinium ion, and a hydrazinium ion.

It is still another object of this invention to provide a method of making N,N-dinitramide salts having the formula $M^+{}^-N(NO_2)_2$ by reacting a nitroamine having the formula $R_b'H_cN(NO_2)_2$ with either a metal-containing compound or a nitrogen-containing compound.

It is still another object of this invention to provide a method of making N,N-dinitramide salts having the formula $M^+{}^-N(NO_2)_2$ by reacting a nitroamine having the formula $L_nZR'N(NO_2)_2$ with a salt having the formula MX, where n is 1 to 3, depending upon the valence of Z; L is the same or different 1-6 carbon alkyl, aryl, hydrogen, halogen, amine, or ether group; Z is an element selected from the class consisting of Si, Sn, Ge, As, B, Sb, Bi, Pb, and Hg; and R' is a 1 to 6 carbon alkylene group; the $M^+$ion is selected from the class consisting of a metal cation, a substituted ammonium cation, an ammonium cation, a substituted hydrazinium cation, and a hydrazinium cation; and the $^-X$ anion is an ion selected from the class consisting of fluoride, chloride, carbonate, hydroxyl, alkoxide, and carboxylate ions.

These and other objects of the invention will be apparent from the following description and accompanying flowsheet.

BRIEF DESCRIPTION OF THE DRAWING

The sole drawing is a flowsheet illustrating one embodiment of the process of the invention.

DETAILED DESCRIPTION OF THE INVENTION

The invention comprises novel dinitramide salts having the formula $M^+{}_r[N(NO_2)_2{}^-]_r$ where r is the cationic charge of M which comprise stable high density, meltable, pumpable oxidizers useful as propellants in rocket engines, including stop-start rocket engines. The salts are stable up to temperatures as high as 140° C. and, unlike prior art perchlorate oxidizers, do not leave smoke trails detectable visually or by radar.

In the formula for the novel dinitramide salts, $M^+{}_r[N(NO_2)_2{}^-]_r$ the M+cation may be a mono, di, or trivalent metal cation, or a nitrogen-containing cation, such as a 1-8 nitrogen-containing cation having the formula $M^+-N(NO_2)_2$, where M+ is an ion containing 1-8 nitrogen atoms and having the formula $(R_kH_mN_n)^{+z}$, wherein n=1 to 8, z=1 to n, k=0 to n+2+z, m=n+2+z−k, and each R is the same or different 1-6 carbon alkyl and where r is the cationic charge of M.

As will be discussed in more detail with respect to the method of making the claimed dinitramide salts, metal ions which may comprise M include metal ions which form soluble salts with either fluoride or chloride. Typical metals which may comprise M include alkali metals Li, Na, K, Rb, and Cs; alkaline earth metals Ca, Ba, Sr, and Mg; Group Ib metals Cu, Ag, and Au; Group IIb metals Zn, Cd, and Hg; Group III metals Al, Sc, Y, Ga, In, and the Lanthanide elements (57-71); Group IV metals Ti, Zr, Hf, Ge, and Sn; Group V metals V, Nb, and Ta; Group VI metals Cr, Mo, and W; Group VIIa metals Mn, Tc, and Re; and Group VIII metals Fe, Co, Ni, Ru, Rh, Pd, Os, Ir, and Pt. Of the foregoing metal ions, Li, Na, K, Be, and Mg are preferred metal ions for the dinitramide salts of the invention.

When the M+ion is a 1-2 nitrogen-containing cation, it may have the formula $R_kH_mN_n{}^+$, wherein n=1 to 2, k=0 to 3+n, m=3+n−k, and each R is the same or different 1-6 carbon straight chain or branched alkyl. Examples of such ions include $NH_4{}^+$, $CH_3NH_3{}^+$, $(CH_3)_2NH_2{}^+$, $(CH_3)_3NH^+$, $(CH_3)_4N^+$, $C_2H_5NH_3{}^+$, $(C_2H_5)_2NH_2{}^+$, $(C_2H_5)_3NH^+$, $(C_2H_5)_4N^+$, $(C_2H_5)(CH_3)NH_2{}^+$, $(C_2H_5)(CH_3)_2NH^+$, $(C_2H_5)_2(CH_3)_2N^+$, $(C_3H_7)_4N^+$, $(C_4H_9)_4N^+$, $N_2H_5{}^+$, $CH_3N_2H_4{}^+$, $(CH_3)_2N_2H_3{}^+$, $(CH_3)_3N_2H_2{}^+$, $(CH_3)_4N_2H^+$, $(CH_3)_5N_2{}^+$, etc.

The M+ion may also comprise a cubane-1,4-bis ammonium ion, such as described in the aforementioned Willer et al. U.S. Pat. No. 4,878,968, cross-reference to which is hereby made; a cubane-1,2,4,7-tetra ammonium ion; a cubane-1,3,5,7-tetra ammonium ion; a cubane-1,2,3,4,-tetra ammonium ion; a cubane-1,2,3,4,7-penta ammonium ion; or a cubane-1,2,4,6,8-penta ammonium ion.

Other nitrogen-containing cations which may comprise M+ include guanidium $(C(NH_2)_3{}^+)$; triaminoguanidinium $(C(N_2H_3)_3{}^+)$; nitronium $(O=N=O^+)$; nitrosonium $(N=O^+)$; and a 1-10,000 nitrogen polymer of ethyleneimine.

a. First Method of Preoarino Dinitramide Salts

The dinitramide salts of the invention may be formed, in one embodiment, by a reaction of a dinitramine having the formula $L_nZR'N(NO_2)_2$ with a metal-containing compound or a nitrogen-containing compound such as ammonia, hydrazine, or a salt having the formula MX, where n is 1 to 3, L is the same or different 1-6 carbon alkyl, aryl, hydrogen, halogen, amine, or ether group, Z is an element selected from the class consisting of Si, Sn, Ge, As, B, Sb, Bi, Pb, and Hg; and R' is a 1 to 6 carbon alkylene group; the $M^{30}$ ion is selected from the class consisting of a metal cation, a substituted ammonium cation, an ammonium cation, a substituted hydrazinium cation, and a hydrazinium cation; and the −X anion is an ion selected from the class consisting of fluoride, chloride, alkoxide, carboxylate, hydroxyl, and carbonate ions. The reaction, when a salt is reacted with the dinitramine, is shown in the following equation:

$L_nZR'N(NO_2)_2+MX \rightarrow MN(NO_2)_2 + L_nZX + R.$

An example of such a dinitramine precursor is 2-trimethylsilylethyl-N,N-dinitramine having the formula $(CH_3)_3Si(CH_2)_2—N(NO_2)_2$.

The dinitroamine precursor may be formed by known prior art methods such as described in Hamel et al. U.S. Pat. No. 3,428,667, cross-reference to which is hereby made; or as described in the aforementioned Third Quarterly Report of AF Contract 04(611)-8549, cross-reference to which is also made.

Alternatively, in accordance with one aspect of the invention, the dinitramine precursor may be formed directly from an aliphatic isocyanate using stoichiometric quantities of nitronium tetrafluoroborate and nitric acid in acetonitrile as the nitrating system as shown in the equation below:

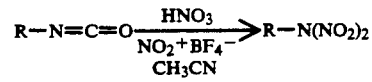

$$R-N=C=O \xrightarrow[\substack{NO_2{}^+BF_4{}^- \\ CH_3CN}]{HNO_3} R-N(NO_2)_2$$

The degradation reaction of the $RN(NO_2)_2$ dinitramine with the MX salt takes places in an inorganic or organic solvent which preferably will be a polar solvent, such as water, alcohols, or acetone, at any pH compatible with the starting materials, but usually within a range of from about 3 to about 10.

The temperature of the degradation reaction may range from −40° C. to 150° C., preferably from about 0° C. to about 20° C. The degradation reaction may be carried out at ambient pressure for a time period which may range from as short as 1 minute to as long as one week, depending upon the reactivity of the starting materials, the temperature selected, and the desired yield. Usually the reaction will be carried out for a period of from about 1 to about 2 hours.

b. Second Method of Preparing Dinitramide Salts

The dinitramide salts of the invention may also be prepared by the initial reaction of nitramide (having the formula $NH_2NO_2$) with a nitrating agent such as nitronium tetrafluoroborate having the formula $NO_2BF_4$ to form the free acid $HN(NO_2)_2$ as shown in the following equation:

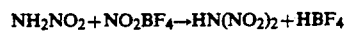

$NH_2NO_2 + NO_2BF_4 \rightarrow HN(NO_2)_2 + HBF_4$

Other nitrating agents which may be reacted with nitramine instead of nitronium tetrafluoroborate include $(NO_2^+)_2(S_2O_7^{-2})$, $NO_2^+AlCl_4^-$, $N_2O_5$, $N_2O_2F$, $NO_2^+PF_6^-$, $NO_2^+AsF_6^-$, $NO_2^+SbF_6^-$, acetylnitrate, trifluoroacetyl-nitrate, trifluoroacetylnitrate in combination with catalytic $BF_3$, acetonecyanohydrin nitrate in combination with catalytic $BF_3$, and any one of these in combination with nitric acid.

This intermediate product is then reacted with the previously described metal-containing compound or nitrogen-containing compound, such as ammonia, hydrazine, and the previously described MX salt to form the dinitramide salt of the invention, which, in the case of the MX salt, is illustrated in the following equation:

$$HN(NO_2)_2 + MX \rightarrow MN(NO_2)_2 + HX$$

If hydrazine is used as the neutralizing agent, extreme care should be exercised when handling the resultant product due to its possible shock sensitivity.

It should be noted that the above reaction works well in the absence of $NO^+$, $NO$, and $NO_2$, i.e. when less than about 5 wt. % total of any or all of the above oxides of nitrogen are present. Therefore, in accordance with a preferred embodiment of the invention, the reagents used in this reaction should be made or purified to provide a content of $NO^+$, $NO$, and/or $NO_2$ less than about 5 wt. %.

The following examples will serve to further illustrate the invention.

EXAMPLE I

To form a 2-(trimethylsilylethyl)-N,N-dinitramine precursor, an ice-cooled mixture of 1.45 grams (11 millimoles) of nitronium tetrafluoroborate, 10 ml of acetonitrile, and 700 milligrams (11 millimoles) of 99+% $HNO_3$ (under argon) was formed, and then 10 millimoles of 2-(trimethylsilylethyl)isocyanate was added, avoiding fume-off by controlling the rate of addition as appropriate. The reaction was stirred for 15 minutes at 0° C., diluted to 25 ml with $CHCl_3$, and filtered rapidly through a 1"×3" plug of $SiO_2$, eluting with 100 ml of $CHCl_3$. Chromatography of the crude product, eluting $CHCl_3$ over $SiO_2$ and collecting the fastest-moving, UV active material ($R_f=0.5$), resulted in collection of 500 milligrams of the desired 2-(trimethylsilylethyl)-N,N-dinitramine precursor, about a 25% yield.

A 1-adamantyl-N,N-dinitramine compound was formed from 1-adamantylisocyanate; and a 1,6-bis(N,N-dinitramino)hexane compound was formed from 1,6-hexane isocyanate using the same procedure as described above.

EXAMPLE II

To about 2.5 milliliters of 2-(trimethylsilylethyl)-N,N-dinitramine, such as formed in Example I, dissolved in 20 ml of acetonitrile and maintained at 20° C. was added 1 gram of tetramethylammonium fluoride. The solution was stirred for about 120 minutes. The tetramethylammonium N,N-dinitramide salt product was then recovered by crystallization from ethyl acetate. The product yield was 900 milligrams or about a 50% yield.

The same procedure was repeated by reacting tetrabutylammonium fluoride and cesium fluoride respectively with 2-(trimethylsilylethyl)-N,N-dinitramine to form the corresponding tetrabutyl ammonium, dinitramide and cesium dinitramide salts.

EXAMPLE III 2 millimoles of nitramide was dissolved in 4 ml of anhydrous acetonitrile cooled under argon to a temperature of −10° C., and then treated with 300 mg (2.3 millimoles) of nitronium tetrafluoroborate. The reaction mixture was stirred for 10 minutes and was then added to a stirred mixture of 8 ml of 1 molar $NH_3$/2-propanol in 100 ml of ethyl ether. The mixture was stirred for 5 minutes. The mixture was evaporated to dryness, triturated with 10 ml of 1:1 acetone/ethyl acetate, filtered, evaporated to dryness, and 0.15 grams of ammonium dinitramide was crystallized from 2 ml of butanol.

EXAMPLE IV 2 millimoles of nitramide was dissolved in 4 ml of anhydrous acetonitrile cooled under argon to a temperature of −10° C., and then treated with 300 mg (2.3 millimoles) of nitronium tetrafluoroborate. The reaction mixture was stirred for 10 minutes and was then added to 8 ml of 1 molar aqueous potassium carbonate. The mixture was stirred for 5 minutes. The mixture was evaporated to dryness, triturated with 10 ml of 1:1 acetone/ethyl acetate, filtered, evaporated to dryness, and 0.15 grams of potassium dinitramide was crystallized from 2 ml of butanol.

EXAMPLE V

To show the stability and utility of the dinitramide salts of the invention, Differential Scanning Calorimetry (DSC) and Thermogravimetric Analysis (TGA) tests were carried out to determine the thermal stability of the compounds as well as the energy derived from each compound. Acid and base stability tests were also carried out to determine the pH range at which the compounds were stable. The results are shown in the following table:

TABLE I

| Dinitramide Salt | $Cs^+$ $^-N(NO_2)_2$ | $NH_4^+$ $^-N(NO_2)_2$ | $N_2H_5^+$ $^-N(NO_2)_2$ |
|---|---|---|---|
| Onset of Decomposition | 190° C. | 140° C. | 150° C. |
| pH Stability | 0-14 | 0-14* | 0-10 |
| Melting Point | 83° C. | 92° C. | 83° C. |
| Energy of Decomposition | 62.4 KJ / Mole | 270 KJ / Mole | 258 KJ / Mole |

*loss of $NH_3$ above 10

Thus, the invention provides novel dinitramide salts useful as oxidizers in rocket fuels and which exhibit high temperature stability, high energy density, and an absence of smoke generating halogens. The dinitramide salts of the invention are meltable and pumpable oxidizers which may be used in start-stop rocket engines instead of other less stable oxidizers

Having thus described the invention what is claimed is:

1. A N,N-dinitramide salt having the formula $M^{+r}[N(NO_2)_2^-]_r$, where M is a cation selected from the group consisting of a metal ion and a nitrogen-containing ion, and r is the cationic charge of M.

2. The N,N-dinitramide salt of claim 1 wherein M is a mono, di, or trivalent metal cation selected from the group consisting of Li, Na, K, Rb, Cs, Ca, Ba, Sr, Mg, Cu, Ag, Au, Zn, Cd, Hg, Al, Sc, Y, Ga, In, Lanthanide elements (57-71), Ti, Zr, Hf, Ge, Sn, V, Nb, Ta, Cr, Mo, W, Mn, Tc, Re, Fe, Co, Ni, Ru, Rh, Pd, Os, Ir, and Pt.

3. The N,N-dinitramide salt of claim 2 wherein M is a metal cation selected from the group consisting of Li, Na, K, Be, and Mg.

4. The N,N-dinitramide salt of claim 1 wherein M is a 1-8 nitrogen-atom containing cation.

5. The N,N-dinitramide salt of claim 1 wherein M is a 1-8 nitrogen-atom containing cation having the formula $R_kH_mN_n^{+z}$, wherein $n=1$ to 8, $k=0$ to $2+n$, $z=1$ to n, $m=n+2+z-k$, and each R is the same or different 1-6 carbon straight chain or branched alkyl.

6. The N,N-dinitramide salt of claim 1 wherein M is a nitrogen-atom containing cation selected from the group consisting of guanidinium; triaminoguanidinium; nitronium; nitrosonium; an ionic polymer of ethyleneimine containing 1-10,000 nitrogen atoms; cubane-1,4-bis ammonium ion; cubane-1,2,4,7-tetra ammonium ion; cubane-1,2,3,4-tetra ammonium ion; cubane-1,3,5,7-tetra ammonium ion; cubane-1,2,3,4,7-penta ammonium ion; and cubane-1,2,4,6,8-penta ammonium ion.

7. The N,N-dinitramide salt of claim 1 wherein said salt is the reaction product of a dinitramine compound with a compound selected from the group consisting of ammonia, hydrazine, and a salt having the formula MX wherein X is an ion selected from the group consisting of fluoride, chloride, hydroxyl, carbonate, alkoxide, and carboxylate.

8. The N,N-dinitramide salt of claim 7 wherein said salt is the reaction product of a dinitramine having the formula $L_nZR'N(NO_2)_2$ with said MX compound, wherein n is 1 to 3; L is the same or different 1-6 carbon alkyl, aryl, hydrogen, halogen, amine, or ether group; Z is an element selected from the group consisting of Si, Sn, Ge, As, B, Sb, Bi, Pb, and Hg; and R' is a 1 to 6 carbon alkylene group; the $M^+$ ion is selected from the group consisting of a metal cation, a substituted ammonium cation, an ammonium cation, a substituted hydrazinium cation, and a hydrazinium cation; and the $^-X$ anion is a halogen ion selected from the group consisting of fluoride and chloride ions.

9. The N,N-dinitramide salt of claim 7 wherein said dinitramide salt is the reaction product of a nitramine compound having the formula $NH_2NO_2$ with a nitrating agent selected from the group consisting of nitronium tetrafluoroborate, $(NO_2^+)_2(S_2O_7^{-2})$, $NO_2^+AlCl_4^-$, $N_2O_5$, $NO_2F$, $NO_2^+PF_6^-$, $NO_2^+AsF_6^-$, $NO_2^+SbF_6^-$, acetylnitrate, trifluoroacetylnitrate, trifluoroacetylnitrate in combination with catalytic $BF_3$, acetonecyanohydrin nitrate in combination with catalytic $BF_3$, and any one of these in combination with nitric acid, and to form an acid having the formula $HN(NO_2)_2$ which is then reacted with a compound selected from the group consisting of a metal-containing compound and a nitrogen-containing compound to form said dinitramide salt having the formula $MN(NO_2)_2$.

10. The N,N-dinitramide salt of claim 1 wherein said salt is the reaction product of a nitramine compound having the formula $NH_2NO_2$ with nitronium tetrafluoroborate to form an acid having the formula $HN(NO_2)_2$, which is then reacted with a compound selected from the group consisting of a metal-containing compound and a nitrogen-containing compound to form said dinitramide salt having the formula $MN(NO_2)_2$.

11. A N,N-dinitramide salt having the formula $M^{+r}[N(NO_2)_2^-]_r$, where r is the cationic charge of M and M is a cation selected from the group consisting of:

a) mono, di, and trivalent metal ions elected from the group consisting of Li, Na, K, Rb, Cs, Ca, Ba, Sr, Mg, Cu, Ag, and Au, Zn, Cd, Hg, Al, Sc, Y, Ga, In, Lanthanide elements (57-71), Ti, Zr, Hf, Ge, Sn, V, Nb, Ta, Cr, Mo, W, Mn, Tc, Re, Fe, Co, Ni, Ru, Rh, Pd, Os, Ir, and Pt;

b) a cation having the formula $R_kH_mN_n^{+z}$, wherein $n=1$ to 8, $k=0$ to $2+n$, $z=1$ to n, $m=n+2+z-k$, and each R is the same or different 1-6 carbon straight chain or branched alkyl; and c) a nitrogen-containing cation selected from the group consisting of guanidinium; triaminoguanidinium; nitronium; nitrosonium; an ionic polymer of ethyleneimine containing 1-10,000 nitrogen atoms; cubane-1,4-bis ammonium ion; cubane-1,2,4,7-tetra ammonium ion; cubane-1,2,3,4-tetra ammonium ion; cubane-1,3,5,7-tetra ammonium ion; cubane-1,2,3,4,7-penta ammonium ion; and cubane-1,2,4,6,8- penta ammonium ion.

12. A N,N-dinitramide salt having the formula $M^+{}^-N(NO_2)_2$ where M is a monovalent cation selected from the group consisting of a metal ion and a nitrogen-containing ion.

13. The N,N-dinitramide salt of claim 2 wherein M is a mono or divalent metal cation selected from the group consisting of Li, Na, K, Rb, Cs, Cu, Ag, Au, and Hg.

14. The N,N-dinitramide salt of claim 13 wherein M is a metal cation selected from the group consisting of Li, Na, and K.

15. The N,N-dinitramide salt of claim 12 wherein M is a cation having the formula $R_kH_mN_n^+$, wherein $n=1$ to 8, $k=0$ to $2+n$, $m=n+3-k$, and each R is the same or different 1-6 carbon straight chain or branched alkyl.

16. The N,N-dinitramide salt of claim 12 wherein said salt is the reaction product of a dinitramine compound with a compound selected from the group consisting of ammonia, hydrazine, and a salt having the formula MX wherein M is a metal ion and X is an ion selected from the group consisting of fluoride, chloride, hydroxyl, carbonate, alkoxide, and carboxylate.

17. The N,N-dinitramide salt of claim 12 wherein the $M^+$ion in said salt has the formula $R_kH_mN_n^+$, wherein $n=1$ to 2, $k=0$ to $3+n$, $m=3+n-31k$, and each R is the same or different 1-6 carbon straight chain or branched alkyl.

18. The N,N-dinitramide salt of claim 17 wherein the $M^+$ion in said salt is selected from the group consisting of $NH_4^+$, $CH_3NH_3^+$, $(CH_3)_2NH_2^+$, $(CH_3)_3NH^+$, $CH_3)_4N^+$, $C_2H_5NH_3^+$, $(C_2H_5)_2NH_2^+$, $(C_2H_5)_3NH^+$, $(C_2H_5)_4N^+$, $(C_2H_5)(CH_3)NH_2^+$, $(C_2H_5)(CH_3)_2NH^+$, $(C_2H_5)_2(CH_3)_2N^+$, $(C_3H_7)_4N^+$, $(C_4H_9)_4N^+$, $N_2H_5^+$, $CH_3N_2H_4^+$, $(CH_3)_2N_2H_3^+$, $(CH_3)_3N_2H_2^+$, $(CH_3)_4N_2H^+$, and $(CH_3)_5N_2^+$.

19. The N,N-dinitramide salt of claim 12 wherein said salt is the reaction product of a dinitramine having the formula $L_aZR'N(NO_2)_2$ with said MX compound, wherein n is 1 to 3; L is the same or different 1-6 carbon alkyl, aryl, hydrogen, halogen, amine, or ether group; Z is an element selected from the group consisting of Si, Sn, Ge, As, B, Sb, Bi, Pb, and Hg; and R' is a 1 to 6 carbon alkylene group; the $M^+$ion is selected from the group consisting of a metal cation, a substituted ammonium cation, an ammonium cation, a substituted hydrazinium cation, and a hydrazinium cation; and the $^-X$ anion is a halogen ion selected from the group consisting of fluoride and chloride ions.

20. The N,N-dinitramide salt of claim 12 wherein said salt is selected from the group consisting of ammonium dinitramide, tetramethylammoniumdinitramide, tetrabutyl ammonium dinitramide, potassium dinitramide, and cesium dinitramide.

21. A N,N-dinitramide salt having the formula $MN(NO_2)_2$ where M is a cation selected from the group consisting of:

a) monovalent metal ions elected from the group consisting of Li, Na, K, Rb, Cs, Cu, Ag, Au, and Hg;

b) a cation having the formula $R_kH_mN_n^+$, wherein $n=1$ to 8, $k=0$ to $2+n$, $m=n+3-k$, and each R is the same or different 1-6 carbon straight chain or branched alkyl; and c) a nitrogen-containing cation selected from the group consisting of guanidinium; triaminoguanidinium; nitronium; nitrosonium; cubane-1,4-bis ammonium ion; cubane-1,2,4,7-tetra ammonium ion; cubane-1,2,3,4-tetra ammonium ion; cubane-1,3,5,7-tetra ammonium ion; cubane-1,2,3,4,7-penta ammonium ion; and cubane-1,2,4,6,8-penta ammonium ion.

* * * * *

UNITED STATES PATENT AND TRADEMARK OFFICE
CERTIFICATE OF CORRECTION

PATENT NO. : 5,254,324
DATED : October 19, 1993
INVENTOR(S) : Jeffrey C. Bottaro, Robert J. Schmitt, Paul E. Penwell, and David S. Ross It is certified that error appears in the above-identified patent and that said Letters Patent is hereby corrected as shown below:

Column 1, line 33, the formula should read: $R\text{-}N((NO_2)_2)_n$; and

Line 43, the formula should read: pentacyclo-$[4.2.0^{2.5}.0^{3.8}.0^{4.7}]$-.

Column 2, lines 8-9, the formula should read: $M^{+r}[N(NO_2)_2^-]_r$;

Line 14, the formula should read: $M^{+r}[N(NO_2)_2^-]_r$;

Lines 20-21, the formula should read: $M^{+r}[N(NO_2)_2^-]_r$;

Line 27, the formula should read: $M^+ \ ^-N(NO_2)_2$;

Line 27, $M^{30}$ (2nd occurrence) should read $M^+$;

Lines 30-31, the formula should read: $M^+ \ ^-N(NO_2)_2$;

Line 31, $M^{30}$ should read $M^+$;

Line 32, the formula should read: $(R_kH_mN_s)^{+z}$;

Lines 36-37, the formula should read: $M^+ \ ^-N(NO_2)_2$;

Line 44, the formula should read: $M^{+r}[N(NO_2)_2^-]_r$; and

Line 44, $M^{30}$ (2nd occurrence) should read $M^+$.

Column 4, line 14, $M^{30}$ should read: $M^+$.

Column 5, line 3, the 2nd formula should read: $NO_2^+ \ AlCl_4^-$.

Signed and Sealed this

Nineteenth Day of July, 1994

BRUCE LEHMAN

*Attest:*

*Attesting Officer*      *Commissioner of Patents and Trademarks*